June 14, 1955 — A. F. DAVENPORT — 2,710,547
DUAL CONTROL APPARATUS
Filed Sept. 10, 1952 — 2 Sheets-Sheet 1
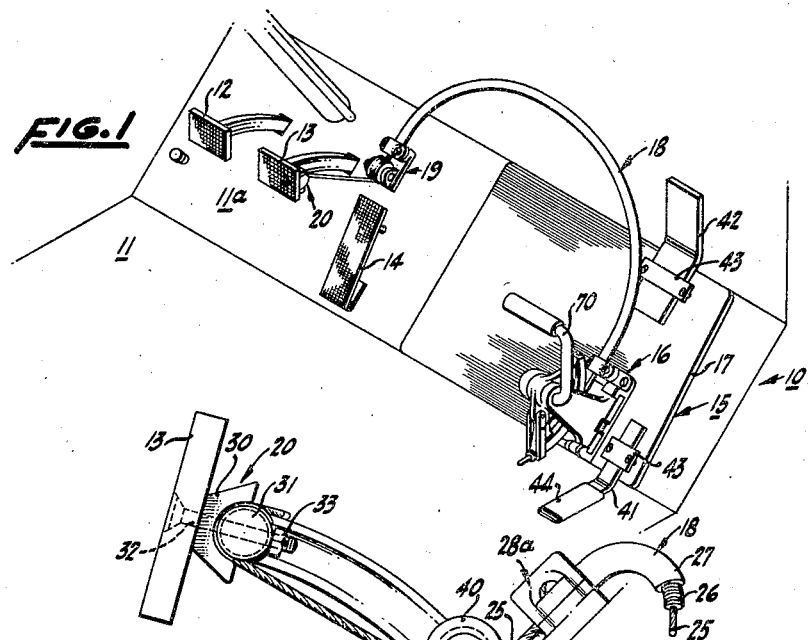
INVENTOR
ALVAN F. DAVENPORT
BY
ATTORNEY

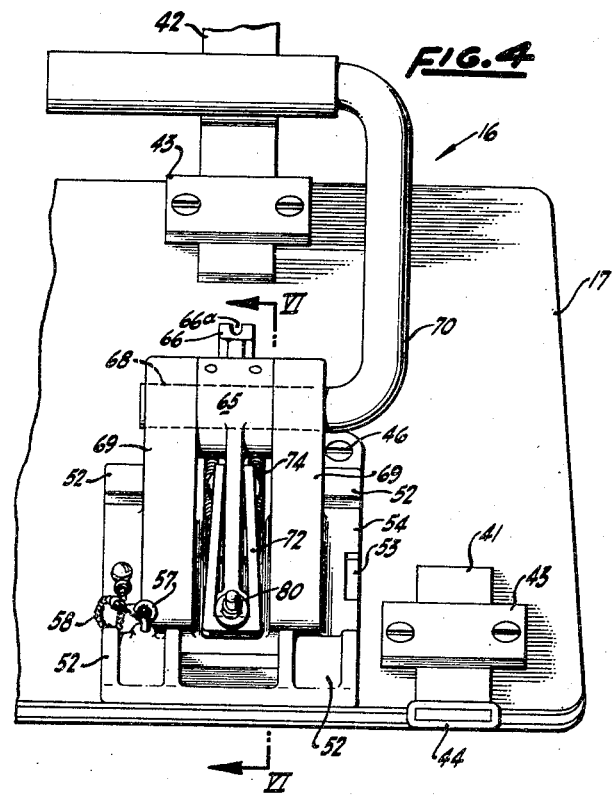

United States Patent Office 2,710,547
Patented June 14, 1955

2,710,547
DUAL CONTROL APPARATUS
Alvan F. Davenport, Richmond, Calif.
Application September 10, 1952, Serial No. 308,882
9 Claims. (Cl. 74—562.5)

This invention relates to apparatus for providing a dual brake control for an automotive vehicle. It is also applicable to the remote control of other similar devices, such as an accelerator pedal and the like.

In instructing persons to drive an automobile it is desirable to provide a dual brake control so that a teacher can, independently of the driver and of the brake pedal operated by the driver, exert some measure of control over the operation of the vehicle. This is important from the standpoint of safety and for psychological effects. A person who is learning to drive an automobile has greater confidence if he feels that an experienced driver beside him is in a position to exert independent control of the movement of the vehicle. Likewise, the teacher may rely upon his own experience in stopping the movement of the vehicle should the occasion arise.

A dual brake control is effective for this purpose, but it should not interfere with the driver's operation of the vehicle except when an instructor so intends, nor should it be a bulky, expensive installation. Moreover, there is a need for a dual brake control which is simple in its construction and operation and which is easily installed and removed from an automobile.

It is an object of the present invention to provide improved dual control apparatus of the general character and for the general purposes described hereinabove.

Another object of the invention is to provide dual control apparatus of the character and for the purposes described which is easily installed and removed from an automobile, and yet completely safe and reliable when installed.

Yet another object of the invention is to provide dual control apparatus of the character and for the purposes described which does not require a complicated mechanism for accomplishing dependent remote control of the brake pedal or other like parts of the control mechanism of an automobile.

A further object of the invention is to provide a dual control apparatus which is simple in its construction and operation, which is inexpensive and which can be easily installed in and removed from an automobile without the need for expensive fixtures and without leaving unsightly holes when removed.

Another object of the present invention is to provide a dual brake control mechanism which, after installation in a vehicle, may be made to operate as a dual control or not, as the driver of the vehicle desires, simply by removing a pin and sliding out the extra brake pedal.

A further object is to provide such a dual brake system which operates at the same brake pressure as the regular foot brake pedal.

These and other objects of the invention will be apparent from the ensuing description and the appended claims.

One form of the invention is illustrated by way of example in the accompanying drawings, in which, Figure 1 is a perspective view of the front or driver's compartment of an automobile showing the apparatus of the invention installed therein.

Figure 2 is a view in side elevation of the brake pedal of an automobile, showing the means of connecting the brake control of the invention thereto.

Figure 3 is a view in side elevation of the main operating assembly of the apparatus of the present invention.

Figure 4 is a front elevation of the main operating assembly.

Figure 5 is a top plan view of the attachment means employed to attach the cable to the brake pedal of an automobile.

Figure 6 is a section taken along the line VI—VI of Figure 4 showing the main operating assembly partly in section and partly in side elevation. In this view the cable is shown disconnected.

Figure 7 is a section taken along the line VII—VII of Figure 6, showing the base of the main operating assembly in plan view.

Referring now to the drawings and more particularly to Figure 1, the front compartment 10 of a passenger automobile is there shown including such conventional elements as a floorboard 11 having a slanting section 11a, a clutch pedal 12, a brake pedal 13 and an accelerator pedal 14. In this figure the device of the present invention is shown installed and it is generally designated by the numeral 15. The apparatus 15 includes a main operating assembly 16, a removable floor plate 17, a cable assembly 18, a cable guide 19, and a pedal connection 20.

As is most clearly shown in Figures 2 and 3, the cable assembly 18 comprises a woven or twisted wire cable 25 which provides the operating connection between the operating assembly 16 and the brake pedal 13 and which is slidable through a helical spring winding 26 which in turn is encased in a rubber sheathing 27. By providing such armoring, not only is dirt and grit kept out, but there is no opportunity of the casing to be deformed so as to prevent free sliding of the cable 25 therein. As shown in Figure 3, one end of the cable assembly is fixed to the main operating assembly 16 by means of a clamp 28 which is described in detail hereinafter.

As shown in Figure 2, the wire cable 25 is clamped to the brake pedal 13 by means of the pedal connection 20 which comprises mating members 30 and 31, a bolt 32 and a nut 33. The rubber sheathing 27 and the helical winding 26 are clamped by means of a clamp 28a which is similar to the clamp 28 and which is integral with a base 34 which is screwed or bolted to the floorboard 11a. The wire cable 25 is threaded about a guide pulley 40 which is rotatably mounted on brackets 41 which are integral with the base 34. The wire cable 25 extends to the connection 20 and is clamped thereto as illustrated.

Referring now to Figures 3 and 6, the main operating assembly 16 is shown as being mounted on a removable base plate 17 which is laid loosely upon the slanting section 11a of the floorboard 11 in a position to the right thereof so that a person sitting beside the driver may comfortably rest his foot on the auxiliary pedal. The width of the base plate 17 is such that it will fit firmly in the space provided by the slanting section 11a of the vehicle's floor board. Outriggers 41 and 42 are provided to stabilize or hold the base plate in position, such outriggers being held on the base by clamps 43 but being readily detachable therefrom. The lower outrigger 41 may be provided with a rubber covering 44 to prevent scuffing of shoes and exposure of metal edges. The rubber covering 44 as well as that covering the base plate 17 are preferably ribbed to provide nonslip engagement. The whole assembly, including the operating assembly 16 and the main base plate 17, can be readily removed as a unit after detaching the cable 25 from the brake pedal, thus avoiding the necessity of bolting the main operating assembly to the floor of the automobile. Alternatively, the base plate 17 may be dispensed with and the main operating assembly 16 may be bolted directly to the floor board of the automobile.

Referring now more particularly to Figures 4, 6 and 7, the operating assembly 16 comprises a base 45 which may be attached to the base plate 17 by any suitable means such as screws 46. Alternatively, as stated, the assembly 16 may be fixed directly to the floor board of the automobile. The clamp 28, as is most clearly shown in Figure 6, is formed in two parts 47 and 47a which are clamped together by means of screws 48 (see Figure 3). These parts are formed with mating grooves to provide a socket 49 terminating in a shoulder 50 to receive one end of the sheathing 27, and a smaller hole 51 to slidably receive the wire cable 25. The base 45 is formed with shoes 52 and a stop member 53 which are shown in Figure 7. The shoes 52 slidably receive a plate 54 upon which the moving parts of the operating assembly are mounted, and the stop member 53 is so placed that when the plate 54 is pushed in from above as viewed in Figure 7 or from the left as viewed in Figure 4, until it abuts the stop member 53, two holes 55 and 56 formed in one of the shoes 52 and in the plate 54, respectively, will register with one another. A pin 57 is provided which is attached to the base 45 by means of a chain 58. It is intended that the pin 57 be placed in the holes 55 and 56 to lock the operating assembly in the proper position. In this manner it is apparent that by merely removing pin 57 and disengaging the cable, the operating assembly can be removed or placed in operation at will after initial installation.

A sector 64 is provided having a hub 65, a rim 66 and spokes 67. The rector 64 is rotatably mounted by means of trunnions 68 on posts or standards 69 which are integral with the plate 54. A pedal 70 is also provided which is integral with one of the trunnions 68. The sector 64 is formed with a peripheral groove 66a to receive the wire cable 25. The left-hand end of the rim 66, as viewed in Figure 6, is notched at 71 for cooperation with a U-shaped latch 72 which is pivotally mounted on the adjacent spoke at 73. The pivot point 73 is off center with respect to the radius from the axis of the sector to the notch 71. A helical spring 74 is provided which is attached at its ends to the latch member 72 and which is looped around one of the spokes of the sector. The latch 72 is free to swing between a release position shown in Figure 6 and a clamping position shown in Figure 3 wherein it engages the notch 71 of rim 66. The placement of the pivot point 73 is such that the spring 74 is under greater tension when the latch 72 is in an intermediate position. Hence, the spring 74 will hold the latch in either of its extreme positions, i. e., in the release position shown in Figure 6 or in the latching position shown in Figure 3. Therefore a positive, although not a great force is required to move the latch 72 from either of these positions. The spring 74, in addition to holding the latch member 72 in either of these selected positions, also functions to snap the latch to either position when it is moved by application of a positive force. In addition to locking the cable in operative position in the groove 66a of the sector 64, the latch 72, because of its extra radial length wedges against the base 42 and acts as a stop against counterclockwise rotation. It is essential that the pivot point 73 of the latch 72 be off center with respect to the sector 64, otherwise it would open and release the cable as soon as it engaged the base 45.

Referring more particularly to Figure 6, it will be seen that a button 80 having a flange 81 is attached to the end of the cable 25 which extends through the hole 51 is clamp 28. In attaching the cable to the operating assembly the sector 64 is rotated more or less to the position shown in Figure 6 and the latch 72 is rotated to the release position which is also shown in Figure 6. The cable 25 is pulled outwardly, then the sector 64 is rotated clockwise as viewed in Figure 6 to approximately the position shown in Figure 3. Engagement of the end of the rim 66 with the flange 81 of button 80 will operate to pull the cable 25 outwardly. The button 80 is then pulled out sufficiently that the cable can be bent somewhat inwardly and the latch 72 is then rotated to the latching position shown in Figure 3 after which the button 80 is released so as to assume the position shown in Figure 3. The cable 25 is thereby clamped in the peripheral groove 66a of sector 64. The operating position is not that shown in Figure 3 but rather the sector 64 of the operating assembly 16, rotates counterclockwise until stopped by the engagement of the latch 72 with the base 45 to prevent further rotation in this direction. Detachment of the cable 25 is carried out in like manner by reversal of these operations.

In use, the spring tension which normally holds the brake pedal 13 in its outward position will also serve to rotate the sector 64 counterclockwise to the operating position where the rotation is stopped by the wedging action of the latch 72 and the base 42. In the operating position the pedal 70 of the operating assembly 16 will be in convenient position so that at all times the instructor may comfortably rest his right foot thereon. This cuts down reaction time required to apply the brakes from the instructor's position. In the operating position the pedal 70 is passed center and the pressure of the resting foot tends to rotate the sector counterclockwise but is stopped by the latch 72. This means that this pressure, however light, is in no way transmitted to the brake or the driver. Whenever the instructor desires to apply the brakes of the automobile, he will place his foot on the pedal 70 of the operating assembly 16 and will push it forwardly. This, of course, will rotate the sector 64 in a clockwise direction. Such rotation of the sector 64 will exert a pull on the cable 25 and will result in operation of the brake pedal 13 to apply the brakes to the automobile. Upon release of the pedal 70, the spring tension on the brake pedal 13 plus the weight of the pedal itself passing over center will operate to restore the pedal 70 to its normal, operative position. The radius of the sector 64 and the leverage of the pedal 70 are so designed that the brakes are applied with the same pressure requirements at the instructor's station as at the driver's station. The extra leverage of pedal 70 merely compensates for friction losses in the operating assembly.

It will thus be apparent that a dual or remote control apparatus has been provided which is adapted to operate a brake pedal or other manually operated control element of an automobile. This apparatus is relatively simple in its construction and operation. It is easily installed and easily detached from an automobile without the necessity of employing more than a very few screws or bolts to fix the assembly to the automobile. When the apparatus is removed it does not leave unsightly holes.

I claim:

1. A pedally operable device for side by side remotely and independently operating another pedal control comprising a base portion detachably mounted on the floor of an automobile and away from the driver's station, an arcuate rotary member mounted on said base portion for rotation in a vertical plane, said rotary member having an arcuate peripheral groove for a cable, a pedal at the driver's station, a pedal for rotating said rotary member, a cable operatively connecting said driver's pedal and said rotary member, and means mounted radially offset on said rotary member for clamping an end of said cable in said groove.

2. A pedally operable braking device for remotely operating the brake of an automobile comprising a base portion attachable to the floor of an automobile and apart from the driver's station, an arcuate rotary member mounted on said base portion for rotation in a vertical plane, said rotary member having an arcuate peripheral groove for a cable, a brake pedal at the driver's station, a pedal for rotating said rotary member, a cable operatively connecting said brake pedal and said rotary member, and a latch member mounted on said rotary member for off-set swinging movement to and from a clamping position for clamping an end of said cable in said groove and stopping counterclockwise rotation in the operating position.

3. A pedally operable braking device for remotely operating the brake of an automobile comprising a base portion attachable to the floor of an automobile and apart from driver's station, an arcuate rotary member mounted on said base portion for rotation in a vertical plane, said rotary member having an arcuate peripheral guide for a cable, a brake pedal at the driver's station, a pedal for rotating said rotary member, an armored cable operatively connecting said brake pedal and said rotary member, a latch member mounted on said rotary member for off-set swinging movement to and from a clamping position for clamping an end of said cable in said guide and stopping counterclockwise rotation in the operating position, and resilient means yieldably holding said latch member in its clamping position.

4. A pedally operable device for remotely and independently operating another pedal control at the operating station comprising a base, a sector having an arcuate, grooved periphery, means rotatably mounting said sector for rotation in a vertical plane, a pedal for so rotating said sector, a pedal at the operating station, a cable attached to said last pedal and guided in said grooved periphery, and a U-shaped latch member mounted radially off-set to swing into and out of engagement with one end of the periphery of said sector and adapted, when in such engagement, to clamp one end of a cable in said groove and stop counterclockwise rotation.

5. A pedally operable device for remotely and independently operating another pedal control at the operating station comprising a base, a sector having an arcuate, grooved periphery, means rotatably mounting said sector for rotation in a vertical plane, a pedal for so rotating said sector, a pedal at the operating station, a cable attached to said last pedal and guided in said grooved periphery, a U-shaped latch member mounted radially off-set to swing into and out of engagement with one end of the periphery of said sector and adapted, when in such engagement, to clamp one end of a cable in said groove and stop counterclockwise rotation and a spring yieldably holding said latch member in engagement with said periphery.

6. A pedally operated device for remotely operating the brake of an automobile comprising a base having guide means thereon and attachable to the floor of an automobile at a location apart from the driver's station, a plate slidable in said guide means, means for locking said plate to said base in a predetermined position, a sector, said sector having a peripheral groove for seating a cable, means mounting said sector on said plate for rotation in a vertical plane, a pedal for rotating said sector, a brake pedal at the driver's station, a sheathed cable operatively connecting said brake pedal and said sector, a U-shaped clamp rotatably mounted radially off-set on said sector to rotate between a release position wherein the clamp is free of the sector and a clamping position wherein it embraces an end of said sector's periphery, and resilient means normally urging said clamp to either of said positions and exerting its greatest torque on said clamp when the latter is in intermediate positions, said device also including a cable clamp adapted to clamp the end of a cable sheath and to slidably receive an inner cable enclosed by such sheath.

7. A remote side by side dual control braking device comprising a cable, means for attaching one end of said cable to a brake pedal or the like, and a remotely placed operating assembly for exerting a pull on said cable to operate said brake pedal, said operating assembly comprising a sector-shaped rotary member having a peripheral groove for seating said cable, means for rotating said rotary member and means mounted radially offset on said rotary member for detachably clamping said cable in said groove and stopping unwanted counterclockwise rotation.

8. A remote side by side dual control braking device for automobiles comprising a cable assembly including an outer protection sheath and an inner wire cable slidable through said sheath, said wire cable extending through said sheath and protruding beyond the ends thereof, a clamp for clamping one protruding end of said wire cable to the brake pedal of an automobile, guide means for guiding said protruding end adjacent such brake pedal, said guide means being attachable to the floor of an automobile, a clamp for each end of said sheath allowing sliding of said wire cable therethrough, said clamps being attachable to the floor of an automobile, and an operating assembly comprising a sector-shaped rotary member, means for mounting such member on the floor of an automobile for rotation in a vertical plane, said rotary member being formed with a peripheral groove for seating the other protruding end of said wire cable, a pedal for rotating said rotary member and a clamp mounted radially offset on said rotary member for securing said last mentioned protruding end of said wire cable to said rotary member.

9. A pedally operated device for remotely and independently operating the brake pedal of an automobile comprising a base plate adapted to be placed on the floorboard of an automobile away from the driver's station, outriggers secured to said plate to stabilize its position, a main base having guide means thereon and attachable to the said base plate, a plate slidable in said guide means, means for locking said plate to said base in operating position, a sector, said sector having a peripheral groove for seating a cable and a notched end in registry with said groove, means mounting said sector on said plate for rotation in a vertical plane, a pedal for rotating said sector, a brake pedal at the operator's station, a cable operatively secured to the brake pedal at one end and at the notch in the sector groove at the other, a U-shaped clamp rotatably mounted on said sector and radially off-set with respect thereto to rotate between a release position wherein the clamp is free of the sector and operative position wherein it embraces the notched end of said periphery and said cable, preventing unwanted counterrotation, and resilient means normally urging said clamp to either of said positions.

References Cited in the file of this patent

UNITED STATES PATENTS

| | | |
|---|---|---|
| 149,211 | Foot | Mar. 31, 1874 |
| 1,370,489 | Sampson | Mar. 1, 1921 |
| 1,404,785 | Michon | Jan. 31, 1922 |
| 1,446,660 | Quay | Feb. 27, 1923 |
| 1,496,610 | Shephard | June 3, 1924 |
| 1,736,330 | Schmidt | Nov. 19, 1929 |
| 2,512,987 | Young | June 27, 1950 |
| 2,599,376 | Ehrenberg | June 3, 1952 |

FOREIGN PATENTS

| | | |
|---|---|---|
| 542,231 | France | May 13, 1922 |